Figure 1:
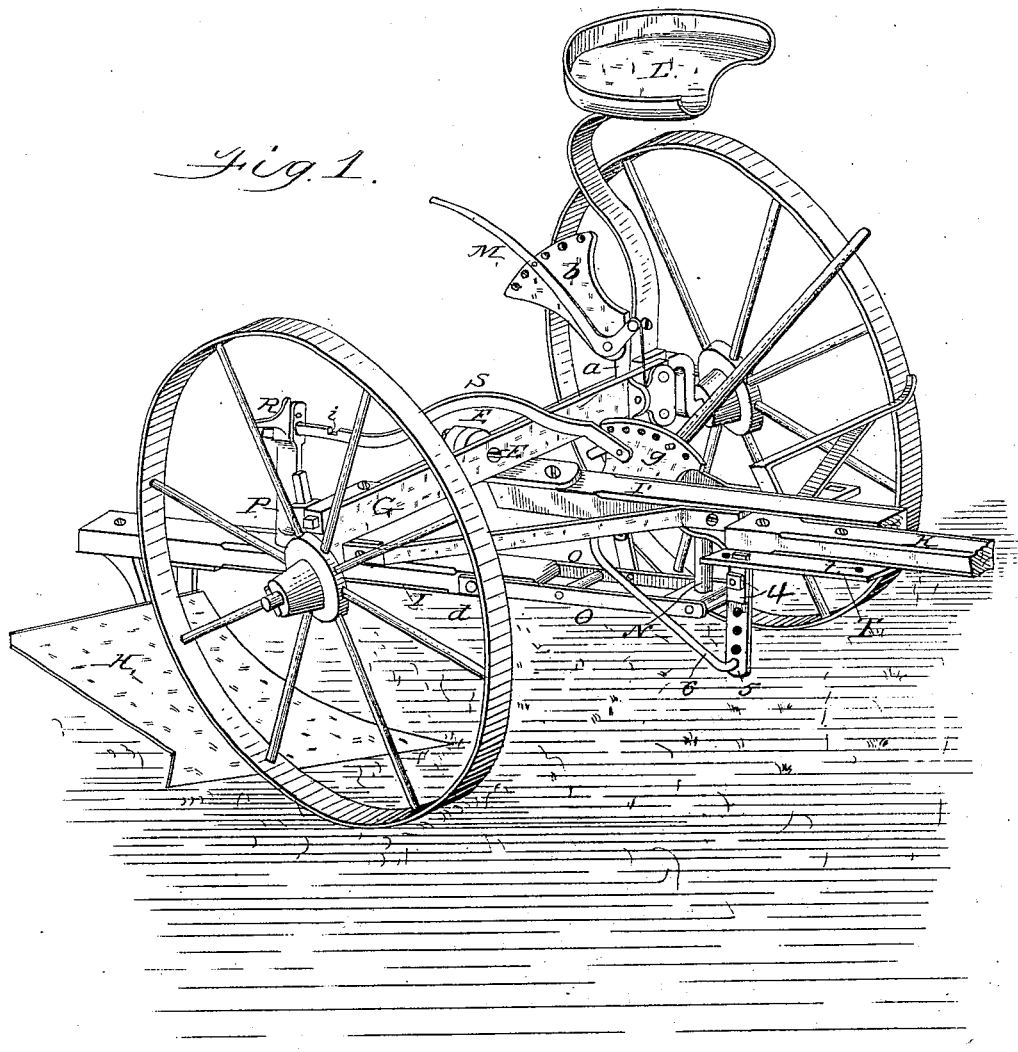

(No Model.) 2 Sheets—Sheet 1.

E. D. & O. B. REYNOLDS.
WHEEL PLOW.

No. 246,203. Patented Aug. 23, 1881.

Witnesses;
D. Walter Fowler
R. K. Evans

Inventor's;
E. D. & O. B. Reynolds
by A. H. Evans & Co
Attys (No Model.) 2 Sheets—Sheet 2.
E. D. & O. B. REYNOLDS.
WHEEL PLOW.
No. 246,203. Patented Aug. 23, 1881.
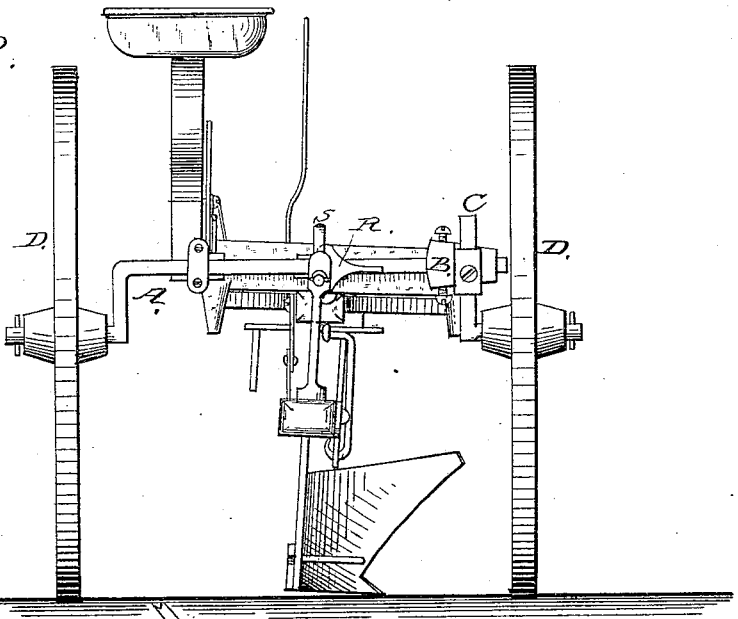
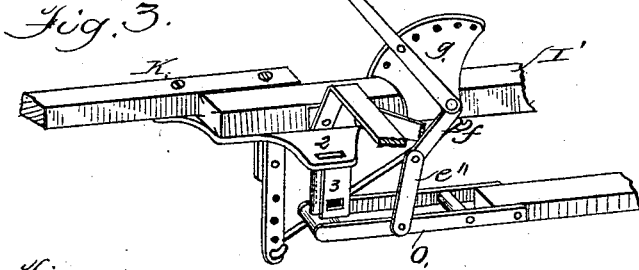
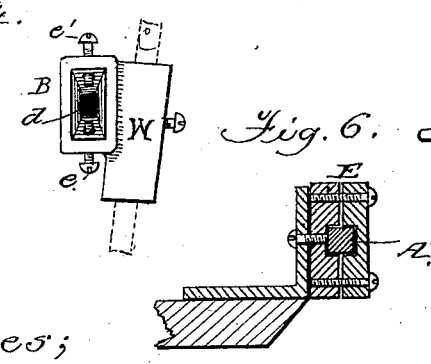
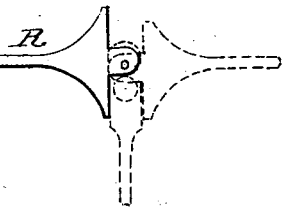
Witnesses;
Walter Fowler
R. K. Evans
Inventor's;
E. D. & O. B. Reynolds
by A. H. Evans & Co
Attys

UNITED STATES PATENT OFFICE.

EDMUND D. REYNOLDS AND OLIVER B. REYNOLDS, OF BROCKTON, MASS.

WHEEL-PLOW.

SPECIFICATION forming part of Letters Patent No. 246,203, dated August 23, 1881.

Application filed May 21, 1881. (No model.)

*To all whom it may concern:*

Be it known that we, EDMUND D. REYNOLDS, and OLIVER B. REYNOLDS, of Brockton, in the county of Plymouth and State of Massachusetts, have invented certain Improvements in Wheel-Plows; and we hereby declare the following to be a full, clear, and exact description thereof, reference being had to the accompanying drawings, making part of this specification, in which—

Figure 1 a perspective view of a machine, showing our improvements. Fig. 2 is a rear view of the same with the adjustments changed. Fig. 3 is a detail perspective view of the same. Figs. 4, 5, and 6 are details to be referred to.

Our invention relates to wheel-plows, and has for its purpose the facilitating of the adjustment and operation of the plow, plow-frame, and tongue; and it consists, first, in pivoting the plow-frame, plow, and tongue to a bar lying parallel to the axle, said bar being centrally supported by a box clamped near the center of the axle; secondly, in making a beveled opening in the box, which slides on the axle and supports or holds the standard from the hub of the adjustable wheel; and, thirdly, in certain details of construction, as hereinafter more fully described and claimed.

In order that those skilled in the art may make and use our invention, we will proceed to describe the manner in which we have carried it out.

In the said drawings, A is the axle of a wheel-plow, having at one end a sliding box, B, in which is secured the standard C of an adjustable wheel, D. Clasping the center of the axle is the clamp-box E, in which is journaled, at F, an oscillating bar, G, parallel to the axle and susceptible of being moved in a vertical arc, and sustaining by proper fastenings the plow H, plow-beam I, plow-frame I', and tongue K. The location of the clamp-box E at the center of bar G distributes the weight of the frame, plow, and beam on each side of the pivotal point, leaving it about in a state of equipoise, so that very little power need be applied to the lever to level the plow. Moreover, the arrangement of the pivotal point at the center enables the driver to level the plow with a much less change of relative position of bar G than if said bar was pivoted at either end. Adjacent to the driver's seat L the oscillating bar is connected by means of a link to the lever M, which is pivoted to the standard $a$ on the axle, and is provided with a rack-frame, $b$. The movement of lever M changes the relation in the horizontal plane between the axle and the bar G, and thereby cants to one side or the other the plow, plow-frame, and tongue without the driver having to leave his seat.

The adjustable box E is provided with a beveled opening, $d$, and screws $e\ e'$, (see Fig. 4,) by which the standard C may be thrown out of a vertical line and the lower portion of the rim of the wheel D thrown inward toward the plow-share, to this extent enhancing the extent of the adjustment of wheel D after box B has been moved as far as possible toward the center of the plow without the end of the axle striking wheel B.

The forward end of the beam is attached to a standard, N, by means of a link, O, pivoted at $d$, and to one side of said link O is a short link, $e''$, which connects it with the bell-crank lever $f$, pivoted to the frame I', and provided with a rack-bar, $g$.

From near the rear of the plow-beam there projects upwardly the standard P, the upper end of which is perforated in the longitudinal line of the machine and bifurcated in a line transverse the machine, and in this bifurcation operates the pivoted latch R, for a purpose hereinafter described.

Pivoted to the rack-plate $g$ and projecting rearwardly over the axle is the curved bar S, which passes through the perforation in standard P, and is provided with offsets $i\ i$.

When the bell-crank lever $f$ is pulled rearwardly the link $e$ raises the rear end of the link O, and with it the end of the plow-beam, and as the rear of the plow-beam is prevented by the bar S from changing its relative position as to elevation with the pivot D, the entire beam is raised in a horizontal line and the plow is lifted from contact with the ground. The latch R, when dropped into the offsets $i\ i$, holds the standard and beam rigidly to bar S and keeps the cutting-point of the plow at any desired angle.

To the front of the frame is secured a draft-plate, T, provided with a series of holes, $t$, for shifting the tongue to meet the requirements of the team. On one side of this plate is a projection, 2, provided with a slot and a downwardly-projecting lug, 3, and on the opposite side is another downwardly-projecting lug, 4, these lugs being for the purpose of attaching the adjustable clevis 5.

Near the axle, on the center of the frame I', is an eye, into which hooks one end of a movable draft-bar, 6, the other end entering one of the holes in the clevis 5, and through the medium of this bar 6 the draft is transferred from the clevis to a point on the frame where the bar enters the eye. When the movable clevis is attached to the lug 3 the hook-bar is unshipped and passes around on the opposite side of the link O.

Having thus described our invention, what we claim as new, and desire to secure by Letters Patent, is—

1. The oscillating bar G, sustaining the frame, share, and plow, and the axle A, in combination with the centrally-located clamping or journal box, E, all constructed, arranged, and operated as set forth.

2. The sliding box B, provided with the beveled opening $d$, in combination with the box W and its adjustable wheel-standard, substantially as and for the purpose described.

3. The tongue-plate T, provided with slots 2 and projection 3, in combination with the movable draft-standard 5 and movable hooked draft-bar 6, all constructed, arranged, and operated as described.

4. The hanger N, link O, toggle-link $e''$, bell-crank lever $f$, and plow-beam I, in combination with the standard P and pivoted supporting-bar S, passing through the upper end of the said standard, as and for the purpose set forth.

5. The open-end standard P, provided with a latch, R, in combination with the supporting-bar S, provided with offsets $i\ i$, substantially as described.

6. The box W to receive the adjustable wheel-standard C, arranged in a plane diagonal to the vertical plane of the axle and raking forward toward the bottom, as shown and described.

EDMUND D. REYNOLDS.
OLIVER B. REYNOLDS.

Witnesses to signature of E. D. Reynolds:
HOSEA KINGMAN,
EDWARD E. HOBART.

Witnesses to signature of O. B. Reynolds:
R. K. EVANS,
JNO. L. CONDRON.